United States Patent [19]

Gertler et al.

[11] 4,314,316

[45] Feb. 2, 1982

[54] ILLUMINATING WHISTLE

[76] Inventors: Leona Gertler; Robert Gertler, both of 23-10A CPL. Kennedy St., Bayside, N.Y. 11360; Dietmar Nagel, 147 South Rd., Chester, N.J. 07930; Melvin Kennedy, 22 Lynn Ct., Hampton Bays, N.Y. 11946

[21] Appl. No.: 142,420

[22] Filed: Apr. 21, 1980

[51] Int. Cl.$^{3}$ .............................................. H04M 1/22

[52] U.S. Cl. ........................................ 362/86; 362/96; 362/109; 362/192; 362/253

[58] Field of Search ................... 362/86, 96, 109, 192, 362/253

[56] References Cited

U.S. PATENT DOCUMENTS 945,311 1/1910 Fendrich ........................... 362/86 X 1,930,504 10/1933 Benjafield ......................... 362/86 X

*Primary Examiner*—Stephen J. Lechert, Jr.

*Attorney, Agent, or Firm*—Jay L. Chaskin

[57] ABSTRACT

An illuminating apparatus which may include audio sound comprises a mouthpiece chamber for producing the forcible passage of air against a flexible conductive contact which completes an electrical circuit to a lamp.

20 Claims, 9 Drawing Figures

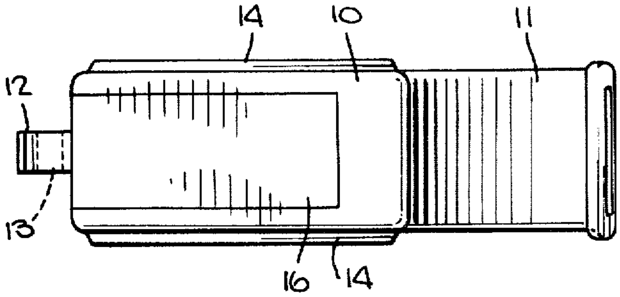
Fig. 3.
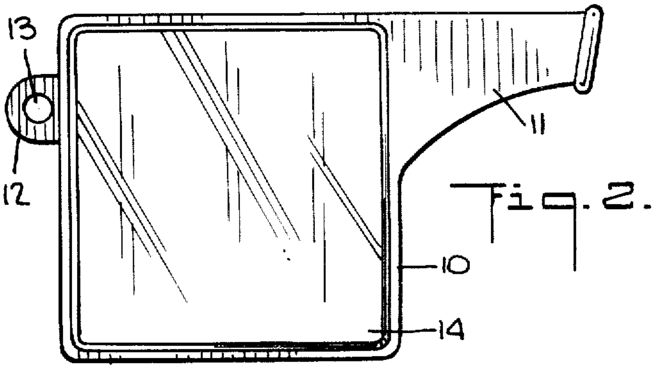
Fig. 2.
Fig. 4.
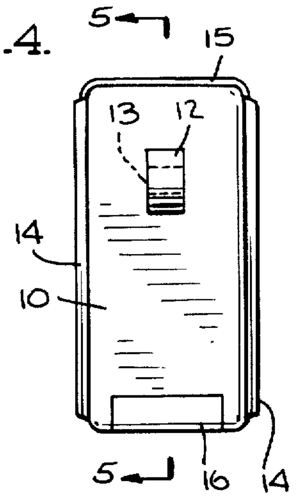
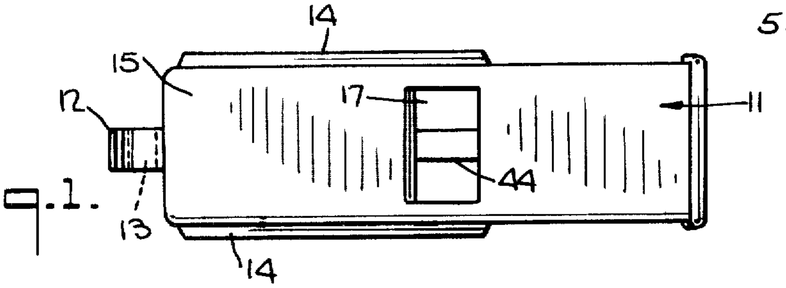
Fig. 1.
Fig. 5.
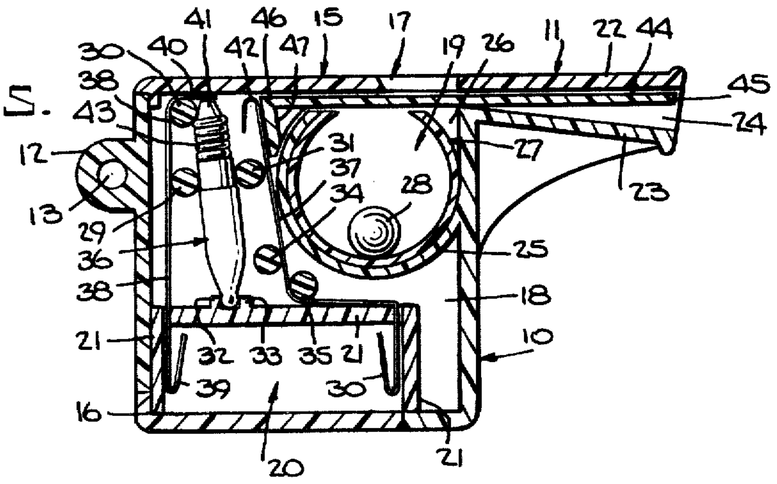

ILLUMINATING WHISTLE

BACKGROUND OF THE INVENTION

This invention is directed to an illumination apparatus which may be combined with an audio producing apparatus, and more particularly, to an apparatus in which light, which may be accompanied by sound, is produced by the forcible passage of air.

In general an apparatus for producing illumination, such as a flashlight or the like, is operated manually or automatically by a specific event. When used as a warning or alerting device it is often accompanied by an independently produced audio alarm. In general an apparatus for producing an audible sound, such as a whistle, is operated orally or by mechanical or electrical actuation. When used as a warning or alerting apparatus it is often accompanied by an independently produced illuminating means, such as a flashing light. In addition to their usefullness for security and supervisory purposes illuminating and audio sound producing apparatus, respectively, are commonly used for purposes of general entertainment, amusement and recreation.

SUMMARY OF THE INVENTION

It is an object of the present invention to provide a simple and inexpensive apparatus for producing or providing illumination in response to the forcible passage of air.

It is a further object of the present invention to provide, in combination with an audible sound, an apparatus for producing or providing illumination in response to the forcible passage of air.

The invention is an apparatus comprising a housing having means for producing the forcible passage of air, preferably orally. Located optionally within the housing is means for producing or providing illumination in response to the forcible passage of air. The forcible passage of air may also produce or provide sound by means optionally located within the housing. The forcible passage of air urges a flexible conductive contact to form an operative electrical circuit and cause the illumination means to be energized.

BRIEF DESCRIPTION OF THE DRAWINGS

The invention will be better understood from the following detailed description when read in conjunction with the accompanying drawings in which:

FIG. 1 is a plan view of a first embodiment of the apparatus according to the present invention;

FIG. 2 is an elevation view of the first embodiment according to the present invention;

FIG. 3 is a bottom view of the first embodiment according to the present invention;

FIG. 4 is a view of one side of the first embodiment according to the present invention;

FIG. 5 is a schematic and cross-sectional view of the first embodiment according to the present invention taken along the line 5—5 of FIG. 4;

DETAILED DESCRIPTION OF THE INVENTION

Figure 6:
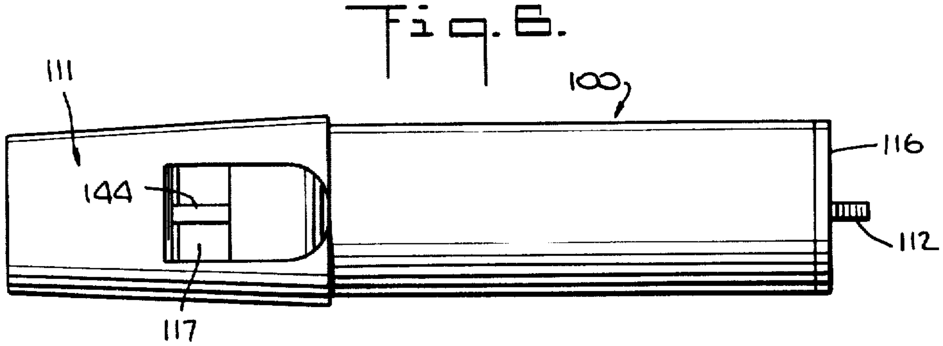
FIG. 6 is a plan view of a second embodiment of the apparatus according to the present invention.
Figure 7:
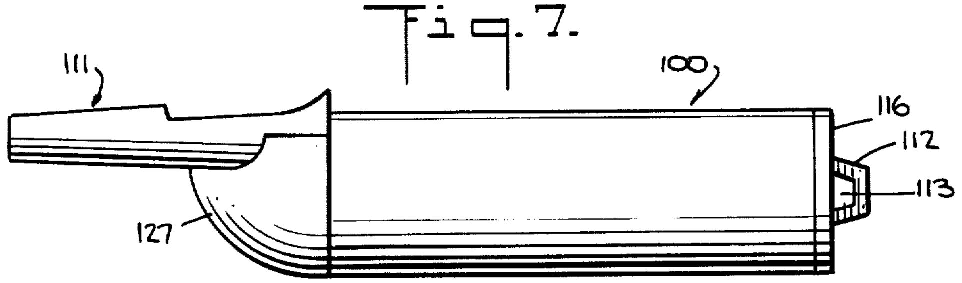
FIG. 7 is an elevation view of the second embodiment according to the present invention.
Figure 8:
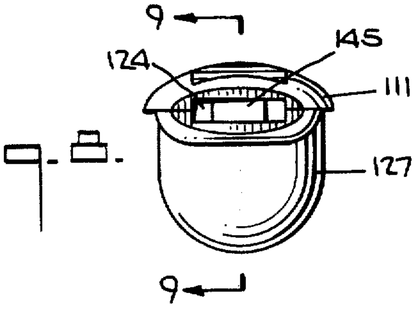
FIG. 8 is a view of one side of the second embodiment according to the present invention.

Referring to the drawing, the apparatus of the first embodiment, as shown in FIGS. 1 to 5, comprises a substantially hollow housing or main body 10 of, for example, a generally polygonal cross-sectional shape. Extending from one side of the housing 10 is a mouthpiece 11; extending from an opposite housing side is a ring 12. The ring 12 includes an aperture 13 for securing, for example, a neck strap or chain. On opposite sides of the housing 10 are side covers or side walls 14 either or both of which may be removed to provide access to the interior of the housing for purposes of assembly or repair. On still further opposite sides of the housing is, respectively, a secured top cover 15 and a removable cover 16 to provide access to a source of electrical energy. Located within the top cover 15 is an opening 17 which produces or provides together with a cavity 19 within the housing an audible sound. The sound 10, mouthpiece 11, side covers 14, top cover 15 and energy source cover 16 may each or in any combination be of a translucent material or otherwise have light transmitting properties. The housing 10 and mouthpiece 11 may, as shown, be formed of a one piece construction, which construction may include the top cover 15 and one of the side covers 14. The housing 10, mouthpiece 11, side covers 14, top cover 15 and energy source cover 16 may be formed from the same or respective different materials. The preferred materials are plastic, although metal or wood, for example may also be used. The several structural elements may have the same or respectively different translucent or light transmitting properties and may also be of one or different colors or multi-colored. The illuminating effect produced or provided by the translucent or light transmitting properties may be enhanced or supplemented by lens-like or reflective features located within or without or both of the structural elements. The several structural elements may be constructed of one or more pieces by known means, such as molding, casting, carving, etc., and assembled by adhesives, fasteners and the like.

The walls of the housing 10, side, top and energy source covers 14, 15, 16 form an enclosure for a first chamber 18, an audio cavity 19 and energy source compartment 20. As can be best seen from FIG. 5, the energy source compartment 20 is formed by the slidably removable energy source cover 16 and energy source positioning members 21. The energy source positioning members 21 are preferably an integral part of the housing. The mouthpiece 11 has an upper wall 22 extending from the top cover 15 and a lower wall 23 extending from the housing 10. The mouthpiece walls 22, 23 preferably an integral part of the housing form a a mouthpiece chamber 24. Extending from within a wall forming the housing first chamber 18 is a preferably integral wall 25 which, together with the top cover 15, forms a second chamber 26. Disposed within the second chamber 26 is an audible sound producing body 27 forming the audio cavity 19 including an element 28 for varying the audible sound. The mouthpiece chamber 24, the top cover 15, opening 17 and the audio cavity 19 are in air passage communication.

The housing first chamber 18 includes positioning members for a means 36 for illumination and an electrically conductive contact strip 37, 38. The positioning members 29–33 are preferably integral with the housing 10. Positioning members 29–33 affix the location of the means for illumination, such as a lamp 36. Positioning members 34, 35 affix the location of a first portion contact strip 37. Positioning members 29, 30 also assist in locating a second portion contact strip 38. Each end of the first and second portion contact strips 37, 38 comprise electrical contacts for activating or energizing the lamp 36. On end of the first portion contact strip 37 and one end of the second portion contact strip 38 comprise terminals 39 which also removably secure the energy source, for example, a suitable battery. The other end of the second portion contact strip 38 forms an electrical contact with one base terminal 41 of the lamp 36. The other end 42 of the first portion contact strip 37 is movable so as to be urged into electrical contact with the other base terminal 43 of the lamp 36 by pivoting about positioning member 34. The contact strips 37, 38 can be of any electrically conductive material providing that the movable contact end 42 of the first portion strip 37 has a resiliency and/or flexibility in a spring-like manner to be urged into electrical contact by the forcible passage of air through the mouthpiece chamber 24.

Disposed generally longitudinally within the mouthpiece chamber 24 is rod means 44 for energizing the lamp 36 in response to the forcible passage of air. The rod means 44 is a light-weight material, preferably a plastic such as that used for the structural elements of the device. Preferably the rod means 44 should not be electrically conductive. The rod means 44 has a first end 45 in the mouthpiece chamber 24. The rod first end 45 preferably has a cross-sectional shape which will provide a surface area to positively react to the air forced into the mouthpiece chamber 24. The cross-sectional surface area should not be so large as to interfere with the forcible passage of air which operates the audible sound means. The second end 46 of the rod means 44 has a depending contact wall 47 substantially abutting the movable contact end 42 of the first portion contact strip 37.

In operation air is forcibly passed, preferably orally, through the mouthpiece chamber 24. The forcible passage of air against the first end 45 of the rod means 44 causes the contact wall 47 to urge the movable contact end 42 towards the base terminal 43 of the lamp 36. Engagement of the movable contact end 42 with the base terminal 43 will complete an electrical circuit through the lamp 36 in the presence of an energy source in the compartment 20. So long as sufficient air pressure is forcibly passed through the mouthpiece chamber 24 the movable contact end 42 will engage the base terminal 43. Completion of the electrical circuit will cause the lamp 36 to be energized and produce or provide illumination. The forcible passage of air through the mouthpiece chamber 24 will also produce or provide an audible sound through the audio cavity 19 and opening 17. The audible sound will continue so long as sufficient air pressure is forcible passed through the mouthpiece chamber 24 into the audio cavity 19. The air pressure necessary to produce or provide illumination or audible sound may be approximately equal or may be unequal, with either the pressure for the illumination greater or less than the pressure for the audible sound. Furthermore the air pressure values can be selected to initiate or terminate the operation of the lamp before or after the audible sound or vice versa. Sufficient decreasing or removal of the air pressure will terminate the audible sound and further cause the movable contact end 42 to electrically disengage from the base terminal 43 and turn off the lamp 36. The first portion contact stip 37 will then return the rod means 44 to a deactivated condition within the mouthpiece 24 as shown in FIG. 5.

The second embodiment, shown in FIGS. 6 to 9, has structural elements functionally similar to the first embodiment. The choice of materials, translucent properties, assembly, etc., disclosed for the first embodiment are equally applicable to the second embodiment.

The housing 100 for the second embodiment is generally tubular having a substantially circular cross-section. Extending from one end of the housing 100 is a mouthpiece 111 and an audible sound producing body 127. The mouthpiece 111 has an upper wall 122 and a lower wall 123 forming a mouthpiece chamber 124. The upper wall 122 includes an opening 117. The audible body 127 encloses an audio cavity 119 and an audible sound element 128. Extending from another end of the housing 100 is an energy source cover 116. The cover 116 may be press-fit or threaded to the housing 100. Extending from the cover 116 is a ring 112 forming an aperture 113. The cover 116 forms a closure for an energy source compartment 120. Extending radially within the compartment 120 are a plurality of positioning members 129, 130 for a lamp 136, an energy source and the contact strips 137, 138. A first portion contact strip 137 includes one energy source terminal 139. The energy source other terminal engages one base terminal 141 of the lamp 136. A contact 140 of a second portion contact strip 138 engages the other base terminal 143 of the lamp 136. Extending within the mouthpiece chamber 124 and a first chamber 118 is a rod means 144. The rod means 144 has a first end 145 within the mouthpiece chamber 124 which has a surface area responsive to the forcible passage of air. The rod means 144 has a second end 146 within the first chamber 118 with a wall 147 depending from the second end 146. The wall 147 is in substantially abutting relationship with a movable contact 142 of the first portion contact strip 137. The mouthpiece chamber 124, the opening 117 and the audio cavity 119 are in air passage communication.

Figure 9:
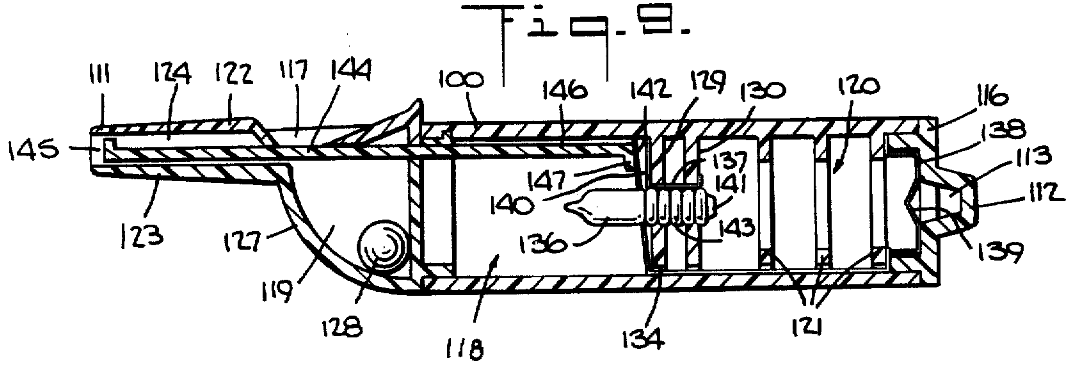
FIG. 9 is a schematic and cross-sectional view of the second embodiment according to the present invention taken along the line 9—9 of FIG. 8.

In operation the forcible passage of air into the mouthpiece chamber 124, preferably orally, causes the rod means 144 wall 146 to urge the movable contact 142 to engage the contact 140 of the second portion contact strip 138 by pivoting about the positioning member 134. In the presence of an energy source between the energy source terminal 139 and one base terminal 141 of the lamp 136 an electrical circuit through the lamp 136 is completed thereby energizing the lamp. In the manner similar to the first embodiment sufficient air passage will maintain the electrical circuit. A sufficient decrease or removal of the passage of air will cause the resiliency of the movable contact 142 to disengage from the contact 140 of the second portion contact strip 138 thereby turning off the lamp 136 as shown in FIG. 9. The forcible passage of air into the mouthpiece 111 may also produce or provide an audible sound through the audio cavity 119 and opening 117. As disclosed with respect to the first embodiment the operation and sequence of either the lamp or the audible sound or both can be varied in the second embodiment.

The means for illumination may comprise one or more sources of illumination which may be energized simultaneously or selectively by additional circuit means. The sources of illumination need not be located only in the housing first chamber. Further the sources of illumination can be a uniform brightness or a single color or a plurality of colors and brightness. The audible sound desired is determined by the dimensions and construction of the audio cavity, the sound element and the opening. If desired the audible sound can be avoided by eliminating the audio cavity (and the sound element) or the opening or both structural features. In addition the means for illumination and the audible sound means can be located within a common housing or separated from each other. Instead of the polygonal and tubular housing, as disclosed, the housing may have a different shape, both in cross-section and plan views. Instead of the physical appearance as shown in the drawing for the other structural elements other shapes and cross-sections are possible.

Various modifications in structure and/or function may be made by one skilled in the art to the disclosed embodiments without departing from the scope of the invention as defined by the claims.

What is claimed is:

1. An apparatus for providing illumination comprising:
means for orally producing the forcible passage of air;
means for providing illumination; and
means for energizing the illuminating means in response to the forcible passage of air comprising non-conductive means having a first portion responsive to the forcible passage of air and a second portion for completing an electrical circuit for the illuminating means.

2. An apparatus for providing illumination and an audible sound comprising:
a housing;
means within the housing for providing illumination;
means within the housing for providing an audible sound by orally producing the forcible passage of air; and
means within the housing for energizing the illumination means in response to the operation of the audible sound means comprising non-conductive means having a first portion responsive to the forcible passage of air and a second portion for completing an electrical circuit for the illuminating means.

3. An apparatus according to claim 1 wherein the illumination means and the energizing means are located within a common housing, the housing including the oral means.

4. An apparatus according to claim 1 or 2 wherein the energizing means comprises a movable contact means.

5. An apparatus according to claims 1 or 2 wherein the energizing means comprises a pair of contact strips, one of the contact strips having contacts engaging the illumination means and the other contact strip having contacts which complete an electrical circuit for the illumination means in response to the forcible passage of air.

6. An apparatus according to claims 1 or 2 wherein the energizing means comprises a rod means having one end responsive to the forcible passage of air and a second end for completing an electrical circuit for the illuminating means.

7. An apparatus according to claims 1 or 2 wherein the energizing means comprises a rod means having an end for engaging a resilient movable contact.

8. An apparatus according to claim 1 wherein the oral means includes a mouthpiece chamber;
a rod means having one end located in the mouthpiece chamber and responsive to the forcible passage of air;
the rod means having a second end substantially abutting a movable contact, the movable contact completing a circuit for the energizing of the illumination means.

9. An apparatus according to claim 1 wherein the apparatus includes an audible sound means.

10. An apparatus according to claims 1 or 2 wherein members position the location of the energizing means and the illuminating means.

11. An apparatus according to claims 1 or 2 wherein the illuminating means is enclosed in a translucent housing.

12. An apparatus according to claims 1 or 2 wherein the apparatus includes an externally located ring.

13. An apparatus according to claim 12 wherein the ring is located on a cover which provides access to an energy source compartment.

14. An apparatus according to claim 11 wherein the housing has a generally polygon shape.

15. An apparatus according to claim 11 wherein the housing has a generally tubular shape.

16. An apparatus according to claim 5 wherein the contact strip engaging the illumination means can also engage an energy source.

17. An apparatus according to claim 5 wherein an energy source may be located between the illuminating means and the contact responsive to the forcible passage of air.

18. An apparatus according to claim 14 wherein the housing includes a first chamber enclosing the illuminating means and the energizing means.

19. An apparatus according to claim 15 wherein the housing includes a first chamber enclosing the illumination means and the energizing means.

20. An apparatus according to claim 1 or 2 wherein the first portion has a cross-sectional shape which will provide a surface area to positively react to the forcible passage of air.

* * * * *